United States Patent
Mittelberger et al.

(10) Patent No.: US 8,272,992 B2
(45) Date of Patent: Sep. 25, 2012

(54) METHOD FOR OPERATING A DRIVE TRAIN

(75) Inventors: Christian Mittelberger, Ravensburg (DE); Mesut Er, Friedrichshafen (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 507 days.

(21) Appl. No.: 12/606,654

(22) Filed: Oct. 27, 2009

(65) Prior Publication Data

US 2010/0125022 A1 May 20, 2010

(30) Foreign Application Priority Data

Nov. 14, 2008 (DE) .......................... 10 2008 043 733

(51) Int. Cl.
*B60W 10/02* (2006.01)
*B60W 10/08* (2006.01)
(52) U.S. Cl. ........................................................... 477/5
(58) Field of Classification Search .................. 477/3, 5, 477/7, 8, 15, 16; 180/65.1, 65.225, 65.245, 180/65.285, 65.6, 65.7
See application file for complete search history.

(56) References Cited

U.S. PATENT DOCUMENTS

| | | | |
|---|---|---|---|
| 6,299,563 B1 | 10/2001 | Shimasaki | |
| 7,178,618 B2 * | 2/2007 | Komeda et al. | 180/65.275 |
| 7,434,641 B2 * | 10/2008 | Takami et al. | 180/65.25 |
| 2007/0155581 A1 * | 7/2007 | Tabata et al. | 477/3 |
| 2010/0093486 A1 * | 4/2010 | Suzuki et al. | 477/3 |

FOREIGN PATENT DOCUMENTS

| | | |
|---|---|---|
| DE | 198 49 156 A1 | 9/1999 |
| DE | 100 08 344 A1 | 2/2000 |

* cited by examiner

*Primary Examiner* — Justin Holmes
(74) *Attorney, Agent, or Firm* — Davis & Bujold, P.L.L.C.

(57) ABSTRACT

A process of operating a motor vehicle drive train that comprises at least one hybrid drive having a combustion engine and an electric motor with a clutch connected between the combustion engine and the electric motor, and an automatic transmission is arranged between the hybrid drive and an output. The process including the step of disengaging the clutch to carry out a shift, after a reduction of load at the internal combustion engine and after a reduction of the torque that is transmitted between the internal combustion engine and the electric motor. Subsequently carrying out a gear shift by the automatic transmission and, thereafter, increasing the torque that is transmitted by the clutch. Increasing the load from the combustion engine, and optionally engaging the clutch. A load transfer by the electric motor occurs before and/or after the gear shift in the transmission is carried out.

13 Claims, 2 Drawing Sheets

METHOD FOR OPERATING A DRIVE TRAIN

This application claims priority from German patent application serial no. 10 2008 043 733.6 filed Nov. 14, 2008.

FIELD OF THE INVENTION

The invention concerns a process for operating at least one transmission and a drive train comprising a hybrid drive of a motor vehicle.

BACKGROUND OF THE INVENTION

The primary components of a drive train of a motor vehicle are a drive unit and a transmission. A transmission provides a speed-power conversion and thus converts the supply of traction force of the drive unit. The invention concerns a process for operating a drive train, which comprises at least one transmission and a hybrid drive as drive unit with an internal combustion engine and an electric machine that can be operated as an electric motor and/or generator.

FIG. 1 shows a drive train diagram of a drive train known from the state of the art having a hybrid drive comprising an internal combustion engine 1 and an electric motor 2, wherein a transmission 4 is connected between the electric motor 2 of the hybrid drive and an output 3 of the drive train. The transmission 4 is an automatic transmission, in which the gear changes or shifts are preferably carried out with an interruption of traction force. A clutch 5, which is disengaged during purely electric motor-based driving in order to decouple the internal combustion engine 1 from the output 3, is connected between the internal combustion engine 1 and the electric motor 2 of the hybrid drive. A drive train such as this typically comprises furthermore either a starting element located in the interior of transmission, which is not shown, or a starting element located outside of the transmission, which is not shown. Such a drive train is also referred to as parallel hybrid drive train.

FIG. 2 shows a diagram, which illustrates the mode of operation known from the state of the art for carrying out a shift in the drive train shown in FIG. 1. In FIG. 2 are shown three torque trends over the time t, namely a time torque trends 6 of a torque that can be transmitted by the clutch 5 connected between the internal combustion engine 1 and the electric motor 2 is shown as a dashed line, a time torque trend 7 of a torque made available by the internal combustion engine 1 is shown as a solid line, and a time torque trend 8 of a torque made available by the electric motor 2 is shown as a dash-dotted line, each specifically during a gear change in the form of a traction shift when the electric motor 2 is operated as a generator.

It is thus apparent from FIG. 2 that in order to carry out a shift in the automatic transmission 4 with previously engaged clutch 5, first the load at the internal combustion engine 1 is reduced (see torque trend 7), and simultaneously the load at the electric motor 2 is reduced (see signal trend 8), while in addition also the torque transmitted by the clutch 5 is reduced according to the signal trend 6. According to FIG. 2, the load made available by the internal combustion engine 1, or the torque made available by the internal combustion engine 1, and the load made available by the electric motor 2, or the torque made available by the electric motor 2, each have a value of zero at the time $t_1$, while the torque that can be transmitted by the clutch 5 amounts to zero only later at time $t_2$. According to the state of the art, the clutch 5 is accordingly disengaged with time delay at time $t_2$ in order to reduce the load at the internal combustion engine 1 and at the electric motor 2, while a gear change is carried out in the automatic transmission between the times $t_2$ and $t_3$. The gear change is completed in the transmission 4 at time $t_3$, while the torque that can be transmitted by the clutch 5 (see signal trend 6) is again built up at time $t_3$. The loads or torques at the internal combustion engine 1 (see signal trend 7) and at the electric motor 2 (see signal trend 8) are again built up delayed in time starting at time $t_4$, according to signal trends 7 and 8.

In the mode of operation of FIG. 2 known from the state of the art for operating a parallel hybrid drive train having an automatic transmission 4, the shift in the transmission 4 is carried out accordingly during the time span $\Delta t_{23}$, but the duration of an interruption of traction force at the output 3 corresponds to the time span $\Delta t_{14}$. The duration of the interruption of traction force $\Delta t_{14}$ accordingly comprises the duration $\Delta t_{23}$ for gear change in the automatic transmission 4, plus the duration until the clutch 5 can be opened at time $t_2$ after the reduction in load at the internal combustion engine 1 and at the electric motor 2 at time $t_1$, and plus the time frame until the clutch 5 can transmit torque after the shift time span $t_3$ has been carried out and torque has built up at the internal combustion engine at time $t_4$.

Based on this state of the art, there is a need for a process for operating a drive train comprising a hybrid drive and an automatic transmission, wherein the interruption of traction force at the output can be shortened.

SUMMARY OF THE INVENTION

Based on this, it is the object of the invention to create a novel process for operating a drive train with a transmission and a hybrid drive. The object is attained by means of a process according to claim 1. According to the invention, a load transfer by means of the electric motor is carried out before carrying out a gear change in the automatic transmission and/or after carrying out a gear change in the automatic transmission.

The duration of the traction force interruption at the output can be shortened with the process for operating a drive train of the invention. A further advantage of the process according to the invention is that discrepancies in the clutch torque of the clutch connected between the internal combustion engine and the electric motor of the hybrid drive have a reduced impact on the shifting comfort.

BRIEF DESCRIPTION OF THE DRAWINGS

Exemplar embodiments of the invention will be explained in more detail with reference to the figures, without being limited to these. In the drawings.

DETAILED DESCRIPTION OF THE PREFERRED EMBODIMENTS

Figure 1:
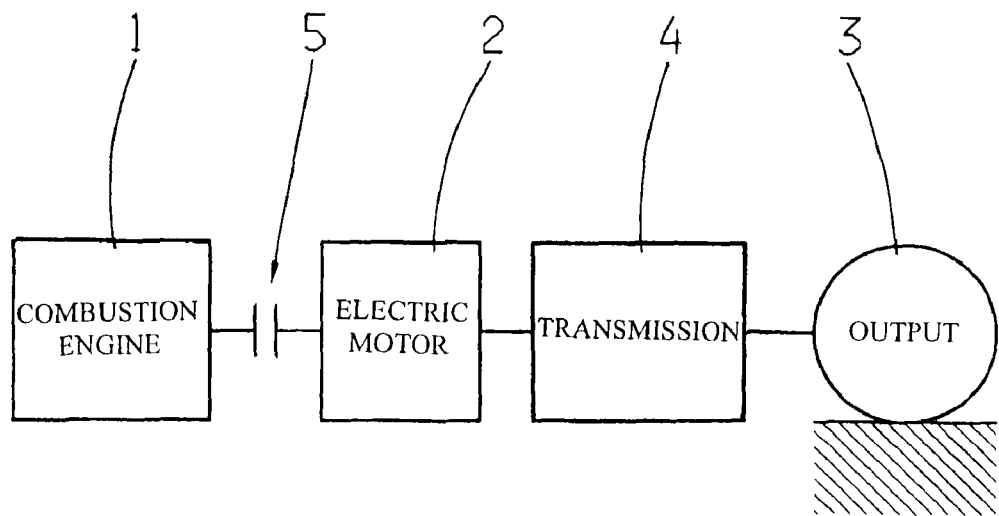
FIG. 1 shows a drive train diagram of a motor vehicle known from the state of the art, in which the process according to the invention can be utilized.
Figure 3:
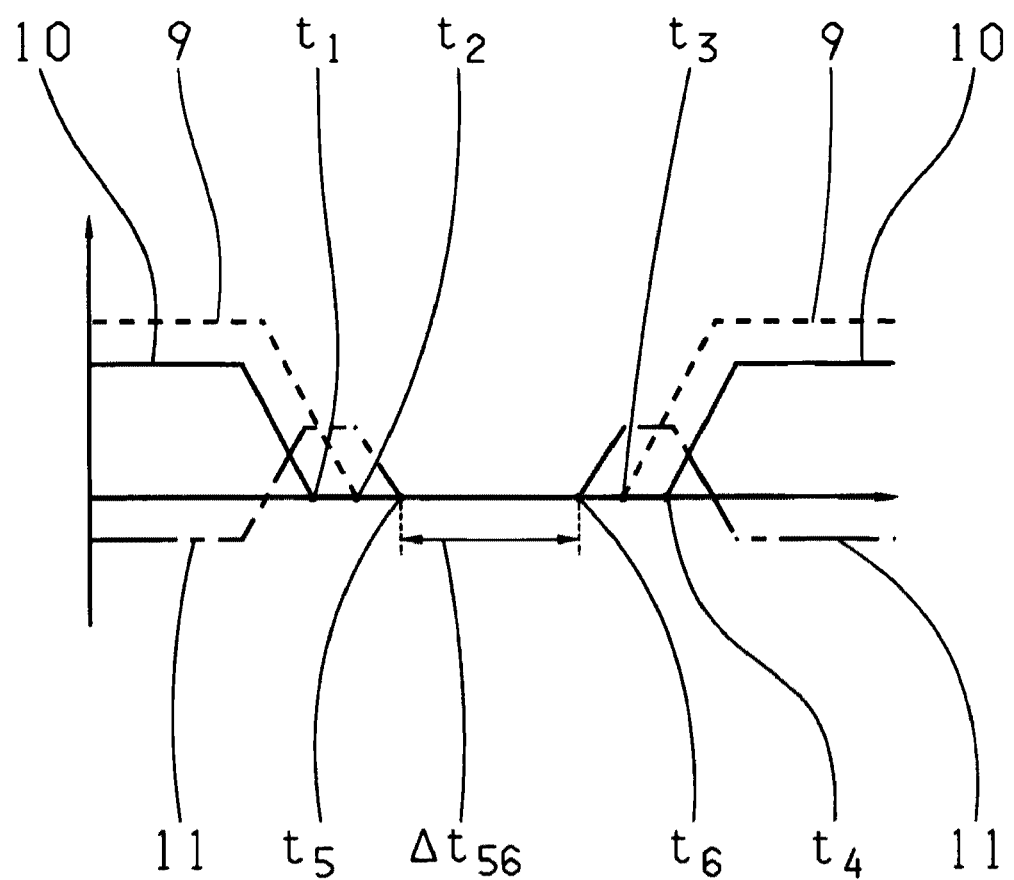
FIG. 3 shows a diagram to illustrate the process according to the invention for operating the drive train of FIG. 1.

FIG. 3 shows a diagram to illustrate the process according to the invention for operating the parallel hybrid drive train shown in FIG. 1, whose transmission 4 is configured as an automatic transmission, which preferably carries out shifts or gear changes with interruption of traction force.

Thus, in FIG. 3, three different torque trends are shown again over the time t, namely a time torque trend 9 of the torque that can be transmitted by the clutch 5 connected between the internal combustion engine 1 and the electric motor 2 is shown as a dashed line, a time-based torque trend 10 of a torque made available by the internal combustion engine 1 is shown as a solid line, and a time torque trend 11 of a torque made available by the electric motor 2 is shown as a dash-dotted line, while FIG. 3 again concerns the case of a traction shift.

According to FIG. 3, the torque made available by the internal combustion engine 1 is again reduced according to the torque trend 10 until it amounts to zero at time $t_1$ before a shift is carried out in the automatic transmission 4. The torque that can be transmitted by the clutch 5 (see signal trend 9) is likewise reduced, while the torque is zero with time delay at time $t_2$ and the clutch 5 is disengaged at time $t_2$.

After carrying out a shift in the automatic transmission 4, at time $t_3$, the torque that can be transmitted by the clutch 5 (see signal trend 9) is also increased again, and the torque made available by the internal combustion engine 1 (see signal trend 10) is increased again with time delay, starting at the time $t_4$.

A load transfer by means of the electric motor 2 is carried out in the sense of the invention before a gear change in the automatic transmission 4 is carried out and/or after a gear change in the automatic transmission 4 has been carried out, while this transfer takes place both before the gear change is carried and after the gear change has been carried out according to FIG. 3.

The torque trends 11 of the torque made available by the electric machine show in FIG. 3 that a load transfer is carried out by means of the electric motor 2, both before the gear change is carried out and after the gear change has carried been out.

It is apparent from FIG. 3 that the load transfer by means of the electric motor 2 before the gear change is carried out is carried out in such a way that after the load reduction at the internal combustion engine 1 at time $t_1$, and after the reduction of the torque that can be transmitted by the clutch 5 at time $t_2$, the electric motor makes available a torque having the same algebraic sign as the previously reduced torque of the internal combustion engine 1.

The load transfer by means of the electric motor 2 is also takes place after a gear change has been carried out in such a way that the electric motor 2 makes available a torque, which has the same algebraic sign as the torque of the internal combustion engine 1 to be built up, before the load buildup at the internal combustion engine 1 at time $t_4$, and before the buildup of torque that can be transmitted by the clutch 5 at time $t_3$.

Before a gear change is carried out, the torque provided by the electric motor 2 at the output is therefore not zero until time $t_5$. Furthermore, after a gear change has been carried out, the torque provided at the output is zero only until the time $t_6$, so that the duration of the interruption of traction force, that is, the time during which the shift is carried out in the automatic transmission 4 is limited.

In FIG. 3, the time during which a shift is carried out in the automatic transmission 4 corresponds accordingly to the duration of the interruption of traction force, which are each characterized by the time span $\Delta t_{56}$.

It is therefore practical according to invention to carry out a load transfer by means of the electric motor 2 from the internal combustion engine 1 before the actual shift is carried out in the automatic transmission 4 and/or after the actual shift has been carried out in the automatic transmission 4. The load transfer is limited by the capacity of the electric motor 2 and by an electric energy accumulator of the drive train. In dependence upon the dimensions of the electric motor 2 as well as the energy accumulator, this leads indeed in most cases to a reduction of the traction force at the output, but not to a complete interruption of traction force before and/or after the actual shift in the automatic transmission 4 has been carried out.

The shifting comfort can be increased, since the load reduction at the internal combustion engine 1 before the shift and the disengagement of the clutch 5 are no longer time-critical.

The actual shift in the automatic transmission 4 is carried out with interruption of traction force and active synchronization by varying the torque made available by the electric motor 2. The duration of the interruption of traction force at the output 3 is limited to the time during which the shift is carried out in the automatic transmission 4.

Even though the load transfer by means of the electric motor 2 takes place both before the shift and after the shift in the automatic transmission are carried out in the embodiment of FIG. 3, these steps are also possible independent of each other. It is therefore possible to take advantage of the load transfer by means of the electric motor 2 exclusively before the shift in the automatic transmission 4 is carried out or also exclusively after the shift in the automatic transmission 4 has been carried out.

According to an advantageous further development of the invention, a charge state of the electric accumulator of the hybrid drive train is monitored in connection with the process according to the invention, wherein a load transfer by means of the electric motor 2 takes place before the gear change is carried out and/or after the gear change has been carried out, only if the charge state of the electric accumulator is greater than a threshold value. To this end is taken into consideration the energy required by the electric motor 2 for synchronization while the gear change in the automatic transmission 4 is carried out. If the charge state of the electric energy accumulator is lower than the threshold value, a load transfer is not carried out by the electric motor 2 before the gear change is carried out and after the gear change has been carried out, because then the energy stored in the energy accumulator is not sufficient to do so.

In this connection, it can be provided that an energy management system of the drive train ensures that sufficient energy reserves are always available in the energy accumulator in order to ensure a load transfer by means of the electric motor before and/or after a shift.

Figure 2:
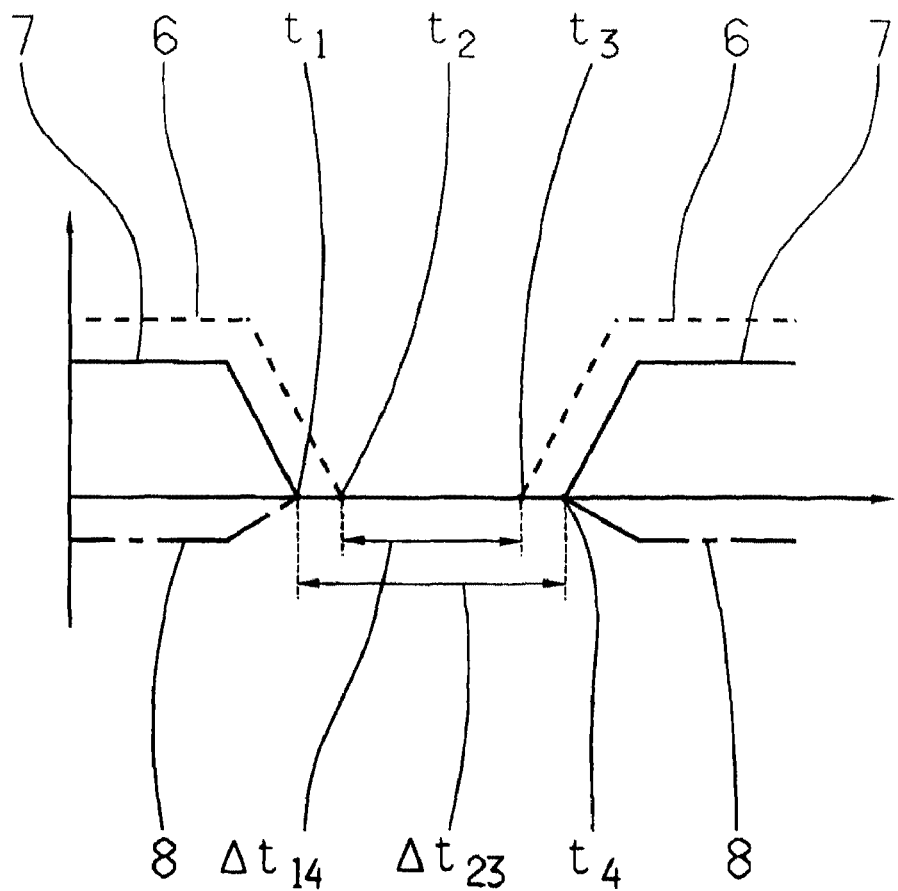
FIG. 2 shows a diagram to illustrate a process for operating the drive train of FIG. 1, which is known from the state of the art.

In the exemplary embodiment shown in FIG. 3, the time $t_5$ at which the output torque is zero before a shift is carried out, is located after the time $t_2$, at which the clutch 5 disengages. This means that the time point at which a shift is carried out is delayed with respect to the state of the art of FIG. 2 by the time span between the times $t_2$ and $t_5$. However, the times $t_2$ and $t_5$, and optionally the times $t_6$ and $t_3$, can coincide by means of an appropriate configuration of the load transfer by means of the electric motor 2, According to a further advantageous further development of the invention, a driver input can be monitored if the time $t_5$ is located after the time $t_2$, and a load transfer by means of the electric motor is only performed if no dynamic or spontaneous gear changes are requested in accordance with FIG. 3, before a gear change is carried out and/or after a gear change has been carried out. If, in contrast, dynamic or spontaneous gear changes are desired, a load transfer by means of the electric motor 2 does not take place before a gear change is carried out or after a gear change has been carried out, but rather a conventional shift as defined by FIG. 2 is carried out.

The process according to the invention can be used for traction shifting and overrun shifting.

REFERENCE NUMERALS

1 Internal combustion engine
2 Electric motor
3 Output
4 Transmission
5 Clutch
6 Torque trend
7 Torque trend
8 Torque trend
9 Torque trend
10 Torque trend
11 Torque trend

The invention claimed is:

1. A method of operating a drive train of a motor vehicle, wherein the drive train comprises at least one hybrid drive having an internal combustion engine and an electric motor, a clutch being connected between the internal combustion engine and the electric motor, and an automatic transmission being located between the hybrid drive and an output, the method comprising the steps of:
   initiating the method while transferring torque from the internal combustion engine, via the automatic transmission, to the output to drive the motor vehicle;
   disengaging the clutch connected between the internal combustion engine and the electric motor to carry out a shift after reducing a load at the internal combustion engine and after a reducing torque that is transmitted between the internal combustion engine and the electric motor,
   subsequently carrying out a gear change with the automatic transmission, and thereafter increasing the torque that is transmitted by the clutch, connected between the internal combustion engine and the electric motor,
   increasing a load at the internal combustion engine, and engaging the clutch connected between the internal combustion engine and the electric motor; and
   transferring a load with the electric motor, at least one of, before carrying out the gear change in the automatic transmission and after carrying out the gear change in the automatic transmission.

2. The method according to claim 1, further comprising the step of transferring the load with the electric motor before the gear change is carried out, with the electric motor providing a torque that has a same algebraic sign as a previously reduced torque of the internal combustion engine after the load is reduced at the internal combustion engine.

3. The method according to claim 2, further comprising the step of providing torque from the electric motor that has the same algebraic sign as the previously reduced torque of the internal combustion engine also after reducing the torque that is transmitted by the clutch.

4. The method according to claim 1, further comprising the step of transferring the load with the electric motor before the gear change is carried out, with the electric motor providing a torque that has a same algebraic sign as the torque of the internal combustion engine that is to be built up before the load buildup at the internal combustion engine.

5. The method according to claim 1, further comprising the step of providing torque with the electric motor that has the same algebraic sign as the torque of the internal combustion engine that is to be built up before building up the torque that is transmitted by the clutch.

6. The method according to claim 1, further comprising the step of carrying out the gear change in the automatic transmission with interruption of traction force and synchronization by varying the torque made available by the electric motor.

7. The method according to claim 1, further comprising the step of monitoring a charge state of an electric accumulator of the drive train and, only if the charge state of the accumulator is greater than a threshold value, transferring a load with the electric motor at least one of before a gear change is carried out and after a gear change is carried out.

8. The method according to claim 7, further comprising the step of considering energy required by the electric motor, for synchronization during the gear change in the automatic transmission, as the threshold value.

9. The method according to claim 7, further comprising the step of, if the charge state of the electric accumulator is lower than the threshold value, preventing a load transfer with the electric motor before the gear change is carried out and after the gear change is been carried out.

10. The method according to claim 1, further comprising the step of, only if either no dynamic or no spontaneous gear changes are requested, monitoring driver input and transferring the load with the electric motor at least one of before the gear change is carried out and after the gear change is carried out.

11. The method according to claim 10, further comprising the step of, if either a dynamic or a spontaneous gear change is requested, preventing the load transfer with the electric motor before the gear change is carried out and after the gear change is carried out.

12. A method of operating a drive train of a motor vehicle, wherein the drive train comprises at least one hybrid drive having an internal combustion engine and an electric motor, a clutch being connected between the internal combustion engine and the electric motor, and an automatic transmission being located between the hybrid drive and an output, the method comprising the steps of:
   reducing torque transmitted by the internal combustion engine to substantially zero;
   reducing torque transmitted through the clutch connected between the internal combustion engine and the electric motor;
   disengaging the clutch connected between the internal combustion engine and the electric motor;
   transmitting torque to the transmission via the electric motor;
   reducing the torque transmitted to the transmission by the electric motor to substantially zero;
   initiating and completing a gear shift in the automatic transmission while torque transmission from the electric motor substantially zero;
   increasing the torque transmitted through the clutch connected between the internal combustion engine and the electric motor; and
   increasing the torque transmitted by the internal combustion engine and engaging the clutch connected between the internal combustion engine and the electric motor.

13. A method of operating a drive train of a motor vehicle, wherein the drive train comprises at least one hybrid drive having an internal combustion engine and an electric motor, a clutch being connected between the internal combustion engine and the electric motor, and an automatic transmission being located between the hybrid drive and an output, the method comprising the steps of:
reducing torque transmitted to the transmission by the internal combustion engine and commencing transmission of torque to the transmission by the electric motor;
reducing torque transmitted through the clutch connected between the internal combustion engine and the electric motor;
ceasing transmission of torque from the internal combustion engine to the transmission before disengagement of the clutch;
disengaging the clutch connected between the internal combustion engine and the electric motor;
reducing the torque transmitted to the transmission by the electric motor to substantially zero;
performing a gear shift in the automatic transmission;
commencing transmission of torque to the transmission via the electric motor before increasing the torque transmitted through the clutch;
increasing the torque transmitted through the clutch connected between the internal combustion engine and the electric motor;
increasing the torque transmitted by the internal combustion engine and reducing the torque transmitted by the electric motor; and
engaging the clutch connected between the internal combustion engine and the electric motor.

* * * * *